United States Patent
Hui et al.

(10) Patent No.: US 10,111,075 B2
(45) Date of Patent: Oct. 23, 2018

(54) SYSTEM AND METHOD FOR WIRELESS PUBLIC ALERTING SERVICE

(71) Applicant: BCE Inc., Verdun (CA)

(72) Inventors: Tony Hui, Thornhill (CA); Francis Fernandes, Mississauga (CA); Brian Smith, Burlington (CA); Shafiq Manji, Toronto (CA)

(73) Assignee: BCE INC., Verdun (CA)

( * ) Notice: Subject to any disclaimer, the term of this patent is extended or adjusted under 35 U.S.C. 154(b) by 198 days.

(21) Appl. No.: 14/994,586

(22) Filed: Jan. 13, 2016

(65) Prior Publication Data
US 2016/0205527 A1 Jul. 14, 2016

Related U.S. Application Data

(60) Provisional application No. 62/102,775, filed on Jan. 13, 2015.

(51) Int. Cl.
*H04W 4/90* (2018.01)
*H04W 4/021* (2018.01)
*H04W 8/02* (2009.01)

(52) U.S. Cl.
CPC ............. *H04W 4/90* (2018.02); *H04W 4/021* (2013.01); *H04W 4/022* (2013.01); *H04W 8/02* (2013.01)

(58) Field of Classification Search
CPC ....... H04W 4/22; H04W 4/021; H04W 4/023; H04W 4/06; H04W 4/90; G06F 9/542; H04L 12/189; H04L 12/1895; G06Q 30/0251
See application file for complete search history.

(56) References Cited

U.S. PATENT DOCUMENTS

| | | | | |
|---|---|---|---|---|
| 6,323,767 B1 * | 11/2001 | Gropper | ................ | G08B 21/10 340/534 |
| 7,421,477 B2 * | 9/2008 | Pettinato | ................ | G06F 9/542 375/E7.024 |
| 8,832,731 B1 * | 9/2014 | Sennett | ................ | G06F 17/275 725/33 |
| 8,995,947 B2 * | 3/2015 | Droste | ................ | H04L 12/1895 455/404.1 |
| 2007/0207771 A1 * | 9/2007 | Bowser | ................ | G08B 27/005 455/404.1 |
| 2008/0293443 A1 * | 11/2008 | Pettinato | ................ | G06F 9/542 455/466 |
| 2009/0181639 A1 * | 7/2009 | Glanton | ................ | H04W 4/22 455/404.1 |

(Continued)

OTHER PUBLICATIONS

Joint ATIS/TIA CMAS Mobile Device Behavior Specification, Aliance for Telecommunications Industry Solutions, ATIS-TIA-J-STD-100, version .15, Jan. 21, 2009, p. 5 #7.*

(Continued)

*Primary Examiner* — Matthew C Sams (57) ABSTRACT

A system, a mobile device and method for wireless public alerting services is provided. The mobile device is configured to receive public alert services over a home network and a roaming network. Geographical location information associated with the mobile device and/or a subscriber of the mobile device is extracted. Based on the geographical location information, the mobile device's behavior associated with the public alert services is configured.

20 Claims, 10 Drawing Sheets

(56) References Cited

U.S. PATENT DOCUMENTS

| | | | | |
|---|---|---|---|---|
| 2010/0306061 | A1* | 12/2010 | Wagner | G06Q 30/02 |
| | | | | 705/14.66 |
| 2013/0288633 | A1* | 10/2013 | Lemberg | H04W 4/14 |
| | | | | 455/404.1 |
| 2014/0024332 | A1* | 1/2014 | Droste | H04L 12/1895 |
| | | | | 455/404.2 |
| 2014/0269465 | A1* | 9/2014 | Ballantyne | H04W 4/06 |
| | | | | 370/311 |
| 2014/0269483 | A1* | 9/2014 | Ballantyne | H04W 4/08 |
| | | | | 370/312 |
| 2014/0273909 | A1* | 9/2014 | Ballantyne | H04W 4/22 |
| | | | | 455/404.1 |
| 2014/0273910 | A1* | 9/2014 | Ballantyne | H04W 4/22 |
| | | | | 455/404.1 |

OTHER PUBLICATIONS

3GPP TS 23.041, 3rd Generation Partnership Project; Technical Specification Group Core Network and Terminals; Technical realization of Cell Broadcast Service (CBS), Release 11, (V11.3.0), Jun. 2012, p. 45.*

* cited by examiner

SYSTEM AND METHOD FOR WIRELESS PUBLIC ALERTING SERVICE

TECHNICAL FIELD

The present disclosure relates generally to wireless communications, and more particularly to systems for providing wireless public alerting services, and method of implementing the same.

BACKGROUND

Wireless public warning systems have been developed to enhance public safety. Wireless public warning systems allow users of wireless devices to receive alert messages indicating possible or imminent threats to safety. For example, Wireless Emergency Alerts (WEA) known as Commercial Mobile Alert System (CMAS) has been introduced in the United States. In Canada, a countrywide Wireless Public Alerting Services (WPAS), similar to the CMAS in the United States, has been proposed. In the Republic of Korea, the Korean Public Alert System (KPAS) has been developed. However user interfaces for those services are typically preconfigured by default in the wireless devices, and their default settings are different between the services.

SUMMARY OF THE INVENTION

In accordance with an aspect of the present disclosure there is provided a method for wireless public alerts, which includes: extracting geographical location information associated with a mobile device and/or a subscriber of the mobile device, the mobile device being configured to receive public alert services over a home network and a roaming network; and based on the geographical location information, configuring the mobile device's behavior associated with the public alert services.

In accordance with a further aspect of the present disclosure there is provided a mobile device which includes: a module for receiving wireless signals including alert messages from public alert services over a home network and a roaming network; and a configuration manager configured to extract geographical location information associated with a mobile device and/or a subscriber of the mobile device; and based on the geographical location information, configure the mobile device's behavior associated with the public alert services.

In accordance with a further aspect of the present disclosure there is provided a computer readable storage medium storing instructions, which when executed by a mobile device, cause the mobile device to perform a method including: extracting geographical location information associated with the mobile device and/or a subscriber of the mobile device, the mobile device being configured to receive public alert services over a home network and a roaming network; and based on the geographical location information, configuring the mobile device's behavior associated with the public alert services.

BRIEF DESCRIPTION OF THE DRAWINGS

One or more features of the disclosure will become more apparent from the description in which reference is made to the following appended drawings.

DETAILED DESCRIPTION

Public alerting systems, elements and methods thereof, are described below, by way of example only, with reference to FIGS. 1-8. The public alerting systems, elements and methods described herein generally relate to providing public alert services from different jurisdictions via wireless communications, to dynamically customizing the mobile device's behavior associated with public alerts, to configuring the mobile device's behavior associated with public alerts based on geographical location information, to triggering jurisdiction specific or user selected handling associated with public alerts, and/or to selectively activating/triggering different public alert operations based on the geographical location information.

The public alerting systems, elements and methods herein may be described in the context of the 3rd Generation Partnership Project (3GPP) Technical Specification (TS) 23.041 v12.8.0 (Technical Specifications Group Core Network and Terminals; Technical Realization of Cell Broadcast Service (CBS)) and 3GPP TS 22.268 v12.2.0 (Technical Specification Group Services and System Aspects; Public Warning System (PWS) requirements). Messaging schemes implemented in the systems, elements and methods described herein may include Canadian WPAS messaging, CMAS messaging, KPAS messaging, and EU-Alert messaging in the European Union. The public alerting systems, elements and methods described herein may utilize the CMAS standard. The public alerting systems, elements and methods described herein may implement WPAS services defined in Senior Officials Responsible for Emergency Management (SOREM) Public Alerting Working Group, National Public Alerting System Common Look and Feel Guidance 1.0; SOREM Public Alerting Working Group, Federal Provincial Territorial (FPT) Requirements for Wireless Public Alerting Dissemination (WPAD) Version 1.0; Canadian Rader Television and Telecommunications (CRTC), Network Working Group, WPAS Development Project Requirements Definition (NTOC0582.docx); CRTC Decision, Broadcasting Regulatory Policy CRTC 2014-444-

Section 101; and SOREM Broadcast Immediate (BI) Alert List. However, the present disclosure is not limited to those specific examples.

Various operations may be described herein using multiple actions in turn, by way of example only. The operations/actions described herein may be implemented in a different order, and the present disclosure is not limited to those specific examples.

The term "system" herein may refer to a computer based system and may include multiple (computer) components or installations operably connected each other, each of which may include one or more programmable processors, one or more memories, components for wireless communications, and one or more hardware and/or software based user interfaces.

The terms "mobile device(s)" and "user equipment(s)" herein may be used interchangeably to refer to a device including one or more programmable processors, one or more memories, one or more user interfaces, and one or more components for wireless communications, broadcast communications, and/or cellular capabilities, which may take the form of a wireless receiver, a wireless transceiver, a handset, a tablet, laptop, a personal digital assistant, a wireless mobile device or a mobile cellular phone.

The term "home network" herein may be used to generally refer to a network associated with a mobile device. The term "roaming network" herein may be used to generally refer to an out-of-home network or a visiting network different from the home network. The term "roaming" herein may be used to generally refer to a connection to services provided via the out-of-home network or visiting network.

Figure 1:
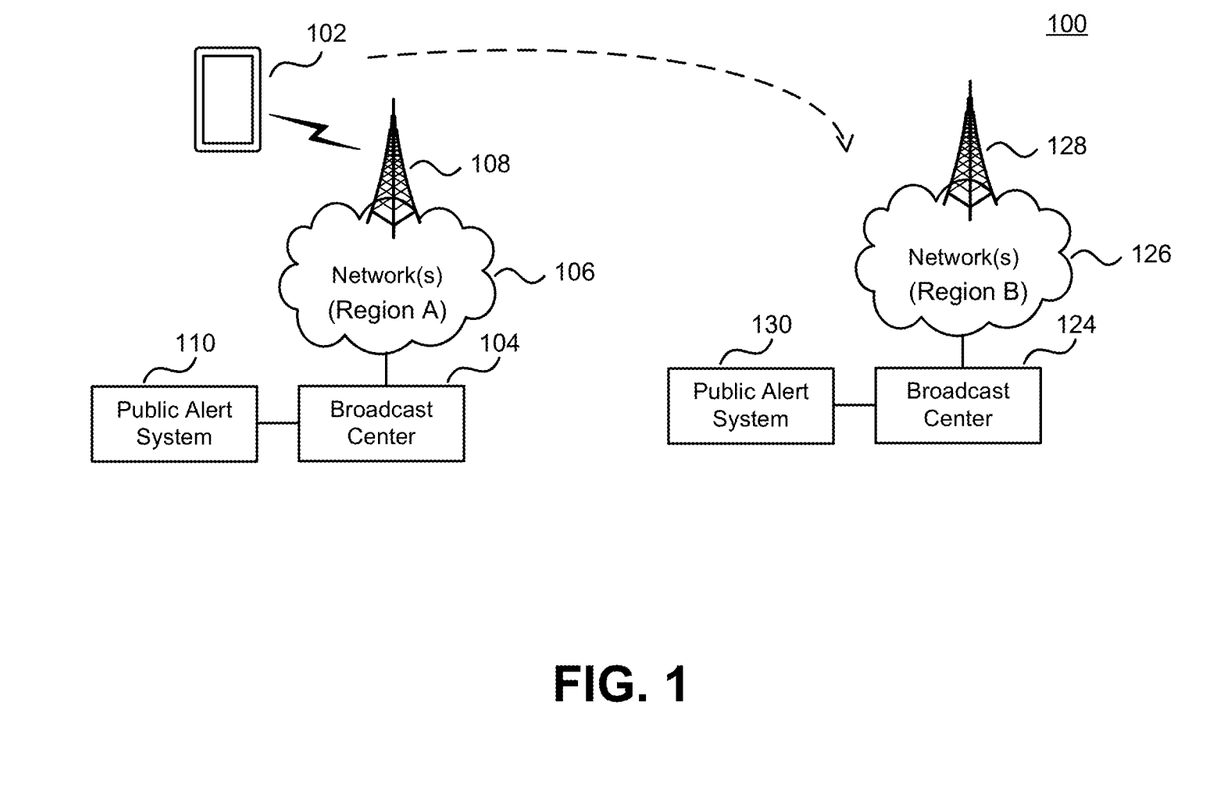
FIG. 1 illustrates an example of a wireless communication system architecture that provide public alerts to a mobile device.

FIG. 1 illustrates an example of a wireless communication system architecture 100 that provides public alerts to a mobile device 102. In this depicted example, there exist wireless networks 106 and 126. The network 106 substantially covers a region A while the network 126 substantially covers a region B. The network 106 may be a home network of the subscriber of the mobile device 102, and the region A may be a home country of the subscriber. The mobile device 102 may be activated using a SIM Card specific to the region A. The network 126 may be a roaming network out of home country. The mobile device 102 has access to wireless services via the network 106 when it operates in the region A. The mobile device 102 also has access to wireless services via the network 126 when it operates in the region B.

The networks 106 may be a Long Term Evolution (LTE) based networks, and may include a base station (or cell site) 108. The network 106 is operably coupled to a national public alerting system 110 via a broadcast center 104. The public alerting system 110 is configured to disseminate public alert messages in the region A using the network 106.

The networks 126 may be a Long Term Evolution (LTE) based networks, and may include a base station (or cell site) 128. The network 126 is operably coupled to a national public alerting system 130 via a broadcast center 124. The public alerting system 130 is configured to disseminate public alert messages in the region B using the network 126.

In one exemplary embodiment, the system 100 provides 3GPP compatible alert messages, and the system 100 may use Short Message Service CB (SMS-CBS). In one exemplary embodiment, the public alerting system 110 or 130 provides WPAS messages in Canada, and the other public alerting system provides CMAS messages in the United States, KPAS messages in the Republic of Korea, EU-Alert messages in the European Union or any other 3GPP based alert messages using CBS scheme. In one exemplary embodiment, the mobile device 102 is a WPAS device. CMAS, KPAS and EU-Alert are exemplary applications that use CBS. The WPAS in Canada is aimed at alerting mobile device subscribers to emergencies of high relevance (e.g. those will imminently or are occurring and near the current location of the mobile device). The aim of the WPAS system is to alert cellular mobile device subscribers to events that are expected to cause "imminent threat to life or property" for people in the geographic area where they happen to be—if they are carrying a mobile device and it is turned on. The system will send government-initiated emergency alerts (e.g., alerts from public safety and emergency management authorities) by broadcasting a brief text message to all mobile devices in a targeted geographic area. Using the WPAS (a) subscribers do not have to be watching television or listening to the radio; (b) subscribers do not need to sign up or register for the service; and (c) the system targets mobile subscribers only in the relevant geographic area of the "emergency" event. The WPAS trial is designed for LTE devices only. CB service that WPAS employs to deliver alerts supports 2 and 3G technologies. For example, the differences between the WEA/CMAS in the United States and the WPAS in Canada include:

1. The WPAS provides bilingual (English and French) language support;

2. The WPAS employs the highest level non-opt out emergency messages (i.e., SOREM Broadcast Immediate (BI) which is equivalent to Presidential Level Alert in WEA). The CMAS specification specifies three classes of text-based alerts (e.g., Presidential, Imminent Threat, and Amber Alerts); and 3. The WPAS specifies a Canadian specific audio attention signal (alert tone), a Canadian specific vibration cadence, and a bilingual alert banner that is a unilingual message to notify wireless users of alerts. The CMAS specification specifies a US-specific audio attention signal and a US-specific vibration cadence.

In one exemplary embodiment, the system 100 provides CBS messages with a Message Identifier (MI) in the range of 4352-6399 (1100 hex-18 FF hex) for public alert services. The MI in the range of 4352-6399 is currently allocated to PWS for use in the United States and other countries. The MI identifies the source and type of the CBS message. In Canada SOREM BI alerts and WPAS test messages are currently mapped to MI=4370 and MI=4380 respectively (3GPP TS 23.041, 3GPP TS 22.268). In one exemplary embodiment, the mobile device 102 is configured to support the MI in the range of 4352-6399, or 4370 to 4379 or 4380, so that the mobile device 102 receiving a message with the specific CBS MI from the WPAS, the CMAS or any other public alert services using the specific CBS MI recognizes the message as being emergency alert.

In one exemplary embodiment, a configuration manager is provided in the system 100 to dynamically customize, change or configure the mobile device 102 behavior associated with public alerts. The configuration manager may be included in the mobile device 102. The configuration manager may be executed on a processor on the mobile device 102. The configuration manager may trigger different mobile device's behaviors based on available public alert profiles (or settings) and a default profile (or default setting). The available public alert settings and the default setting may be provided via wireless networks or from manufactures. The configuration manager may change user interactive menus displayed on a screen of the mobile device 102 to set up a public alert operation specific to a public alert service. The configuration manager may provide the option of setting one or more of user interfaces associated with public alerts (e.g., an alert attention signal, a vibration cadence, and/or an alert banner). The configuration manager may provide an option to a user of the mobile device via a user interactive menu to change a configurable setting associated with public alerts. An audio attention signal, a vibration cadence and/or an alert banner that are presented with public alerts may be selected or formed in order to match any desired or customized characteristics (e.g., to match the current Radio and television characteristics for Public Alert messages).

In one exemplary embodiment, the configuration manager for the mobile device 102 utilizes geographical location information associated with the mobile device 102 or the mobile device's subscriber to customize, change or configure the mobile device's behavior. In one exemplary embodiment, the geographical location information may be extracted or detected or determined from a Mobile Country Code (MCC). In another exemplary embodiment, the geographical location information may be extracted or detected or determined by using any other available means, such as a sensor, a global positioning system (GPS) and/or WiFi technology, which may be included in, attached to, or integrated with the mobile device 102. The configuration manager may implement extraction or detection or determination of the geographical location information. The geographical location information may be extracted or detected or determined in response to a request from the user of the mobile device or in response to notification from a public alerting system. The geographical location information may be extracted or detected or determined every time the mobile device registers with a public alert service or a network.

In one exemplary embodiment, an audio attention signal, a cadence and an alert banner that may be presented with a public alert by the mobile device 102 may be coded and stored in an internal library in the mobile device 102. The mobile device 102 may look up the library based on the determination of the geographical location information of the mobile device 102. In another exemplary embodiment these user interfaces may be generated on the fly.

In one exemplary embodiment, the public alerting system 110 or 130 is a WPAS based system configured to re-use CMAS specifications with some modifications including:

1. Introduce a unique cadence and alert on the user end (user equipment) to match the Radio and Television characteristics for Public Alert.

2. utilize Cell Broadcast technology on LTE.

3. To issue emergency messages of "critical" nature only, e.g., with Canadian reference 'BI'.

4. WPAS messages will be mandatory, where users cannot opt out,
a. Only one MI to be utilized for Cell broadcast (4370),
b. Will also support the test message identifier (4380) supported for devices that support a required monthly test (RMT) only,
c. Interface D and E (per CMAS specification) will remain intact, 5. Deliver a combined English and French content within a uni-language message, 6. The management of the WPAS 'C' interface will remain a Canadian only specification, which includes implementations of mapping of content and use of geo-targeting methodology.

In FIG. 1, one broadcast center 104, one network 106, and one public alerting system 110 are shown in the region A for illustration purposes only. There may exist one or more broadcast centers 104 and one or more networks 106 in the home region A. In FIG. 1, one broadcast center 124, one network 126, and one public alerting system 130 are shown in the region B for illustration purposes only. There may exist one or more broadcast centers 124, one or more networks 126, and one or more public alerting systems 130 in the region B.

Figure 2:
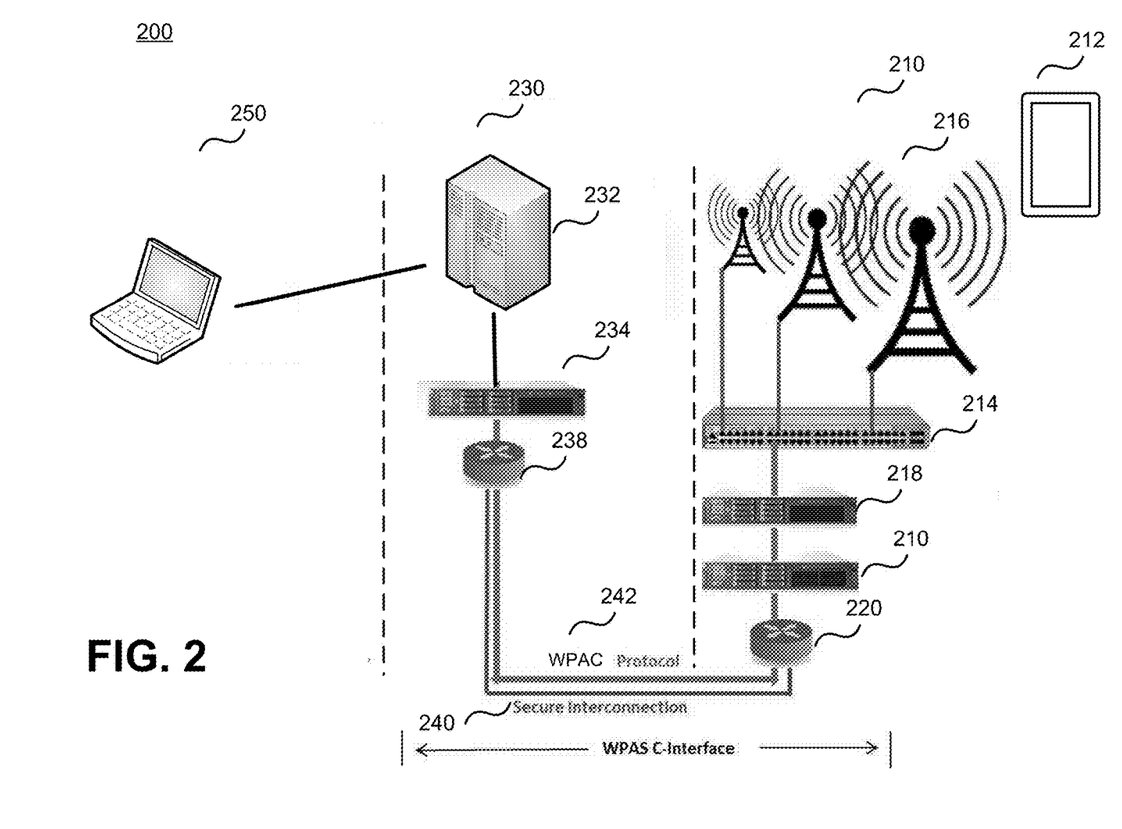
FIG. 2 illustrates an example of a public alerting system architecture that may be implemented in the system of FIG. 1.

FIG. 2 illustrates an example of a public alerting system architecture that may be implemented in the system 100 of FIG. 1. The system 200 of FIG. 2 is a WPAS based system that utilizes cell broadcast technology to distribute emergency alerts and that may provide public alerts to mobile devices including a cell broadcast enabled mobile device 212. The cell broadcast provides a one-to-many geographically focused service, which enables messages to be communicated to multiple mobile phone customers who are located within a given part of its network coverage area at the time a message is broadcast. In FIG. 2 there exit a cell broadcast system 210 and a public alerting service system 230. The public alerting service system 230 may correspond to the public alerting system 110 or 130 shown in FIG. 1. The mobile device 212 may correspond to the mobile device 102 shown in FIG. 1. The mobile device 212 may be a WPAS compatible device and identify alert messages defined with a MI in the range of 4352-6399 (1100 hex-18 FF hex), such as alert messages from the public alerting service system 230. The mobile device 212 is configured to customize its behavior with respect to public alerts. In FIG. 2, the mobile device 212 operates within the range of a LTE radio access network (RAN) 216. The network 216 may correspond to the network 106 or 126 shown in FIG. 1. The network 216 is operably coupled to a core network 214 and a cell broadcast center (CBC) server 218. The CBC 218 may correspond to the broadcast center 104 shown in FIG. 1. The CBC 218 is operably coupled to the public alerting system 230. The public alerting system 230 is in communication with alerting authorities 250 (e.g., federal agencies, municipal agencies, provincial agencies, territorial agencies). An operator in each authority 250 may validate the source of alerts, to decide to issue alerts and to formulate alert messages in standardized Canadian Profile of Common Alerting Protocol (CAP-CP). The public alerting system 230 is configured to collect, authenticate and accept alert messages from the alerting authorities 250 and to dissimilate them to target distributes. Alert messages from the public alerting system 230 are broadcasted in the form of cell broadcast messages via the network 216.

In one exemplary embodiment, the public alerting system 230 includes a WPAS based system 232, which may be implemented by a National Alert Aggregation & Dissemination (NAAD) System, and the alerting authorities 250 may include an expanded NAAD system interface that includes geo-targeting functionality. The public alerting system 230 may be configured to convert CAP-CP alerts sent by the alerting authorities 250 to Wireless Public Alert Service Architecture for C-interface (WPAC) format. WPAC defines the parameter mapping from B interface CAP-CP message into C interface. The public alerting system 230 may include a component 234 to map B interface CAP-CP messages into C interface WPAS messages as defined in ATIS J-STD-101. The alert gateway 234 of the system 230 may then deliver alerts over a secure interface 240 based on profiles (e.g., WPAS profiles) maintained in the alert gateway 234 to another gateway 210 maintained by the wireless broadcast system 210. The system 200 has a secure interconnection 240 between the gateway 234 of the public alerting system 230 and the gateway 210 of the cell broadcast system 210. The gateway 210 and 234 may be implemented by software. In this example, the alert messages using WPAC protocol 242 are provided to the gateway 210 of the cell broadcast system via routers 238 and 220. The alert gateway 220 then transmits alert messages to mobile wireless service providers including the CBC 218. The mobile device 212 receives alert messages in the format of CMAC via the network 216 which may be in Canada.

In one exemplary embodiment, the mobile device 212 is a WPAS LTE mobile device that is operable in accordance with the J-STD-100/J-STD-100A CMAS Mobile Device Behavior Specification and is capable of receiving and identifying CMAS messages and WPAS messages. The mobile device 212 may be configured to facilitate delivery of bilingual emergency alerts when the mobile device 212 is in Canada or out of Canada. The mobile device 212 may be configured to connect directly to a facility-based Canadian Wireless Service Provider's LTE Network and to display a minimum of 280 characters on an embedded screen and approved by Canadian WSP equivalent to CMSP in the United States for use on their networks. Implementation of the Canadian WPAS requirements may be mobile device manufacture dependent.

In FIG. 2, one broadcast system 210 and one public alerting service system 230 are shown for illustration purposes only. There may exist one ore more broadcast systems 210. In FIG. 2, the CBC 218 and the core network 214 are illustrated separately; however, the CBC 218 may be integrated to the core network 214.

In one exemplary embodiment, other mobile devices operating in the systems 100 and 200 in FIGS. 1 and 2 may be configured in the manner same as the mobile device 102 in FIG. 1 and/or 212 in FIG. 2. In one exemplary embodiment, mobile devices in the system 100 of FIG. 1 or 200 of FIG. 2 may include the WPAS default setting defining the WPAS alert banner, the WPAS alert attention signal, and the WPAS vibration cadence. Alternatively mobile devices in the system 100 of FIG. 1 or 200 of FIG. 2 may include the CMAS default setting defining ringtone and vibration cadence. A common set of requirements for WPAS capable mobile device behavior whenever a WPAS alert message is received and presented may allow for a consistent user experience regardless of the associated wireless technology within the mobile device. Additionally, this common set of requirements may allow Federal, Provincial and Territorial level government agencies to develop subscriber WPAS awareness information that is independent of the wireless technology.

Figure 3:
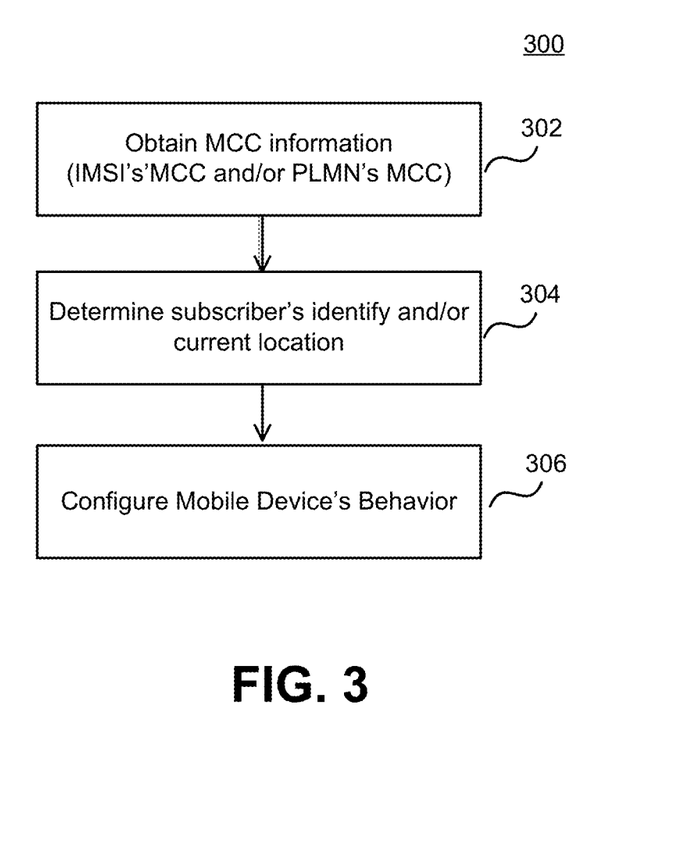
FIG. 3 illustrates an exemplary method for customization of a mobile device's behavior associated with public alerts using MCC information.

FIG. 3 illustrates an exemplary method for customization of a mobile device's behavior associated with public alerts using MCC information. The method 300 of FIG. 3 may be implemented in the mobile device 102 in FIG. 1 or 212 in FIG. 2. In this example geographical location information associated with the mobile device or the mobile device's subscriber is determined using MCC information. The mobile device detects MCC information associated with the mobile device (302). The mobile device may obtain MCC information embedded within the International Mobile Subscriber Identity (IMSI) by consulting the IMSI information stored in the Universal Subscriber Identity Module (USIM) of the mobile device. The mobile device may obtain MCC information in the Public Land Mobile Network (PLMN) associated with the mobile device. The IMSI is assigned to a subscriber of the mobile device, and the IMSI's MCC may be used to identify the subscriber (or the subscriber's home country). The PLMN is used to identify a serving network to which the mobile device is attaching, and the PLMN's MCC may be used to identify the country where the mobile device currently exists. The mobile device may determine the subscriber's identity, the current location or a combination thereof. Based on the determination of the specific MCC information, the mobile device may configure its behavior associated with public alerts, which includes activating a corresponding audio alert attention signal setting, a corresponding vibration cadence setting and/or a corresponding banner setting (if available), and/or configuring a user interactive menu to set up a public alert specific application (306). These settings may be subsequently applied to all received or incoming emergency alerts.

For example, if the IMSI's MCC='302' (Canadian specific code), it is determined that the mobile device is provisioned by a Canadian carrier, and the user is a Canadian subscriber. In this case the mobile device may be activated using a Canadian SIM Card. If the PLMN's MCC='302' (Canadian specific code), it is determined that the mobile device is attaching to a Canadian Wireless Service Provider and the mobile device is currently located in Canada. If the IMSI's MCC≠the PLMN's MCC, it is determined that the mobile device may be roaming.

In one exemplary embodiment, if the user is a Canadian subscriber and the mobile device is roaming in a visiting country and receiving public alerts specific to that country, the mobile device may selectively activate the Canadian audio attention signal, the Canadian alerting vibration cadence, and/or the Canadian bilingual alert banner (unilingual message) associated with the WPAS when if such settings are permitted in the visiting country.

In another exemplary embodiment, the mobile device's behavior may be changed based on a combination of a MCC of the IMSI (USIM's MCC) and a MCC of the PLMN, at least in accordance with the following scenarios (1)-(4). The scenarios given herein are for explanatory purposes only and should not be constructed as limiting.

(1) Canadian Subscriber at home in Canada: In an exemplary first scenario where the IMSI's MCC and the PLMN's MCC='302', it is determined that the user of the mobile device is a Canadian subscriber and the mobile device is located in its home country, i.e., Canada. The mobile device uses the WPAS default setting. When the mobile device receives a public alert, which is a SOREM BI alert, the mobile device presents it with the WPAS alert banner, the WPAS alert attention signal and the WPAS vibration cadence.

In the first scenario, the BI alert is the highest level non-opt out emergency message in Canada. Thus the mobile device does not present a configuration menu like CMAS configuration menu. In the event that the mobile device optionally supports a RMT (i.e., test message), the mobile device may present a user interactive menu to turn RMT one or off.

(2) Canadian Subscriber roaming in the United States: In an exemplary second scenario where the IMSI's MCC='302' and the PLMN's MCC='311', '312', '313', or any other codes indicating a US network, it is determined that the user of the mobile device is a Canadian subscriber and the mobile device is roaming in the United States. The mobile device uses the default CMAS setting defined under the CMAS standard. When the mobile device receives a public alert, the mobile device will present it with the CMAS banner (if available), the CMAS alert attention signal and the CMAS vibration cadence. In the event that the mobile device supports the option of setting or changing an alert banner setting, an alert attention signal setting, and/or a vibration cadence setting, the mobile device may operate based on the new setting(s). For example, the Canadian WPAS alert banner, the Canadian WPAS alert attention signal and/or the Canadian WPAS vibration cadence may be presented rather than the CMAS banner (if available), the CMAS alert attention signal and/or the CMAS vibration cadence while roaming.

In the second scenario public alerts received by the mobile device may be Imminent Threat class and/or Amber class alerts defined under the CMAS standard. Thus the mobile device presents a configuration menu to configure the receipts of these classes. In the event that the mobile device optionally supports a RMT (i.e., test message), the mobile device allows the RMT's configuration in the configuration menu.

(3) Canadian Subscriber roaming in a country other than the United States: In an exemplary third scenario where the IMSI's MCC='302' and the PLMN's MCC=a country code other than those specific to Canada and the United States, it is determined that the user of the mobile device is a Canadian subscriber and the mobile device is roaming in a country other than the United States. The mobile device uses the default WPAS setting to present an alert banner, an alert attention signal and/or a vibration cadence based on the IMSI's MCC. When the mobile device receives a public alert, the mobile device will present it with the WPAS banner, the WPAS alert attention signal and the WPAS vibration cadence. In the event that the mobile device supports the option of setting or changing an alert banner setting, an alert attention signal setting and/or a vibration cadence setting from the default setting to a local setting specific to the visiting country, the mobile device may operate based on the local setting.

(4) US Subscriber using a Canadian WPAS mobile device roaming in Canada: In an exemplary fourth scenario where the IMSI's MCC (USIM's MCC)='311', '312', '313', or any other codes indicating a US network and the PLMN's MCC='302', it is determined that the user is a United States subscriber and the mobile device is roaming in Canada. In the event that the user using the WPAS compatible mobile device receives a BI alert, the mobile device may activate the CMAS attention signal and the CMAS vibration cadence based on the PLMN's MCC, and also may activate the WPAS alert banner. The mobile device may optionally present a menu that will allow the subscriber to select an alert attention signal setting and/or a vibration cadence setting from those defined under the CMAS or the WPAS to activate when WPAS BI alerts are received.

Figure 4:
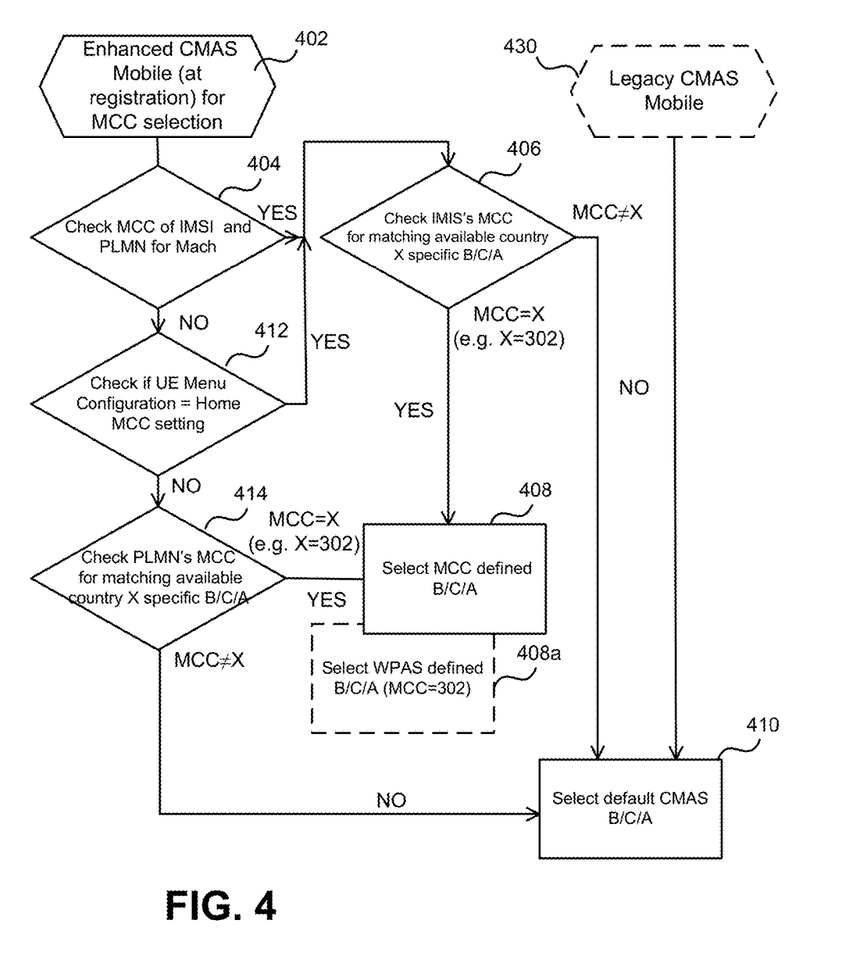
FIG. 4 illustrates an exemplary selection method for a jurisdiction specific banner, audio attention signal and/or cadence when in or out of home country.

FIG. 4 illustrates an exemplary selection method for a jurisdiction specific banner, audio attention signal and/or cadence when in or out of home country. In FIG. 4, "B/C/A" refers to "a banner/cadence/attention signal". In this depicted example, the selection method is implemented in an enhanced CMAS mobile device (402) that may receive and identify alert messages defined with a MI in the range of 4352-6399. The CMAS mobile device has the CMAS default setting associated with an audio attention signal ("A"), a vibration cadence ("C")and/or an alert banner ("B") setting (if available) and other available public alert setting (s) may be available. The enhanced CMAS mobile device (402) provides with the option to change its default setting. The enhanced CMAS mobile device may correspond to the mobile device 102 of FIG. 1 or 212 of FIG. 2. In this depicted example, the operation flow of a legacy CMAS mobile device (430) is also schematically illustrated for purposes of comparison. The legacy CMAS mobile device that is configured to receive and identify the CMAS service is capable to implement public alert user interfaces defined by CMAS only (410).

For the enhanced CMAS mobile (402), the mobile device checks a MCC of the IMSI and a MCC of the PLMN associated with the mobile device (404). The IMSI's MCC and the PLMN's MCC are compared. If the IMSI's MCC matches the PLMN's MCC, it is determined that the enhanced CMAS mobile is now in its home country. The mobile device checks the IMSI's MCC to determine its available public alert profile specific to the IMSI's MCC (406). In the event that IMSI's MCC=a country code X other than those for the United States, a banner setting, an audio attention signal setting and/or a cadence setting specific to the IMSI's MCC is selected (408). For example, in the event that IMSI's MCC='302', the user of the mobile device is a Canadian subscriber, and the WPAS setting, which may include the WPAS alert banner setting, the WPAS audio attention signal setting and the WPAS vibration cadence setting specific to the Canadian WPAS, is selected (408a). Otherwise, the CMAS default setting, which may include an alert banner setting (if available), an audio attention signal setting and a cadence setting specific to CMAS, is selected (410).

If the IMSI's MCC does not match the PLMN's MCC, it is determined that the mobile device may be roaming. Then it is determined whether the UE menu configuration (default) is the same as the home MCC setting (i.e., home mobile country code) (412). If the UE menu configuration is the same as the home MCC setting, it is determined that the mobile device has been set to override the setting, and it goes to the selection of the home country setting (406).

If the UE menu configuration is different from the home MCC setting, the mobile device uses the PLMN's MCC to determine its available public alert profile specific to the PLMN's MCC (414). In the event that PLMN's MCC=a country code X other than those for the United States, a banner setting, an attention signal setting and/or a cadence setting specific to the PLMN's MCC is selected (408). For example, in the event that the PLMN's MCC='302', the WPAS setting, which may include the WPAS alert banner setting, the WPAS audio attention signal setting and the WPAS vibration cadence setting specific to the Canadian WPAS, is selected (408a). Otherwise, it reverts to the service network's setting (i.e., local setting). In this case, the CMAS default setting, which may include an alert banner setting (if available), an audio attention signal setting and a cadence setting specific to CMAS, is selected (410).

Figure 5A:
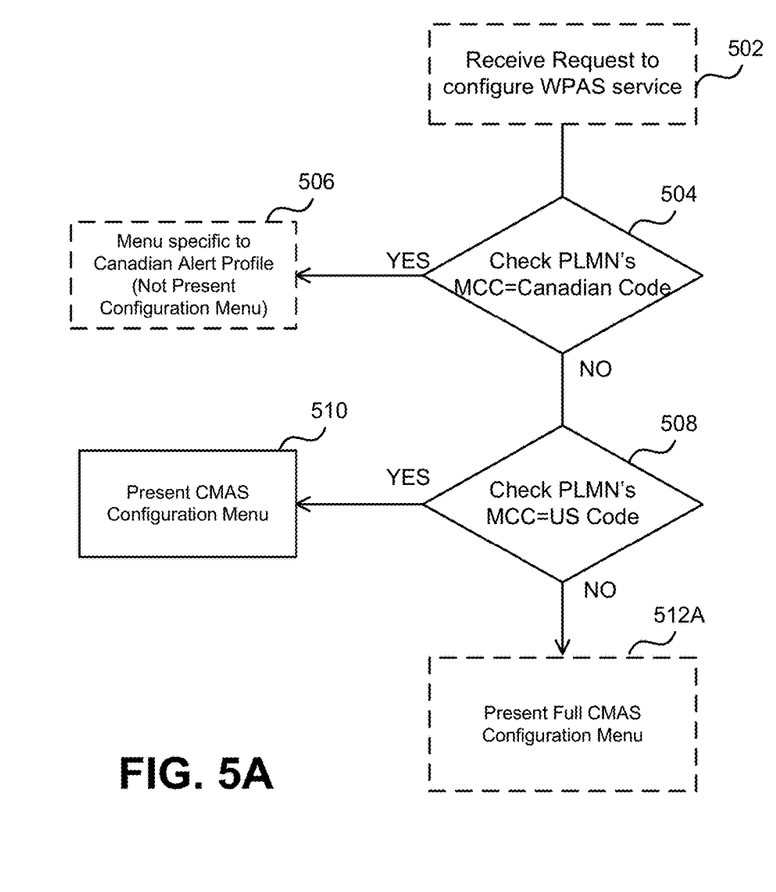
FIG. 5A illustrates an exemplary configuration process for use in a mobile device.
Figure 5B:
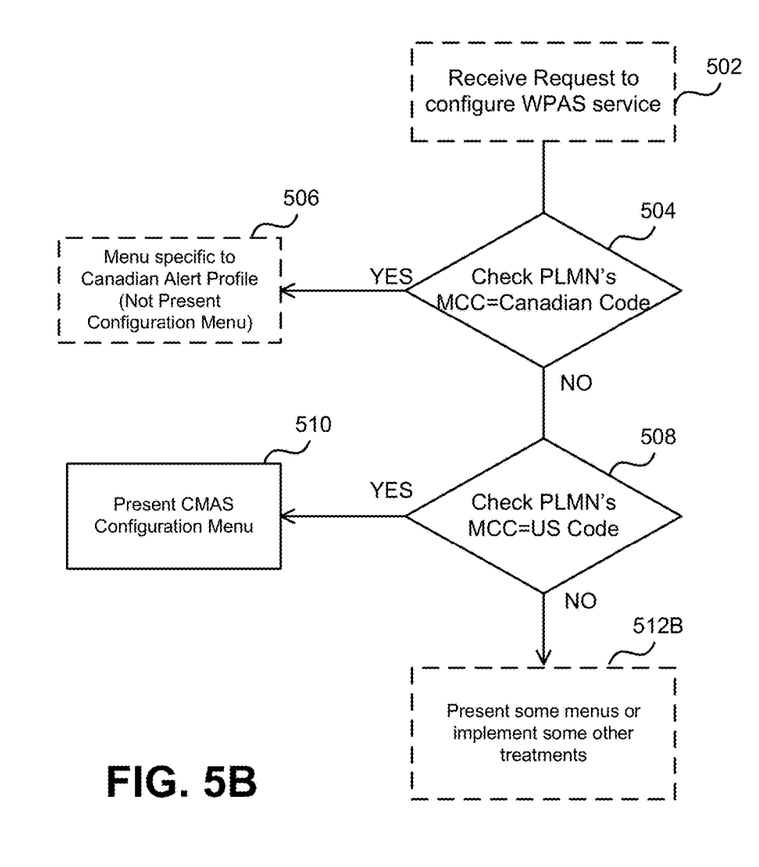
FIG. 5B illustrates another exemplary configuration process for use in a mobile device.
Figure 5C:
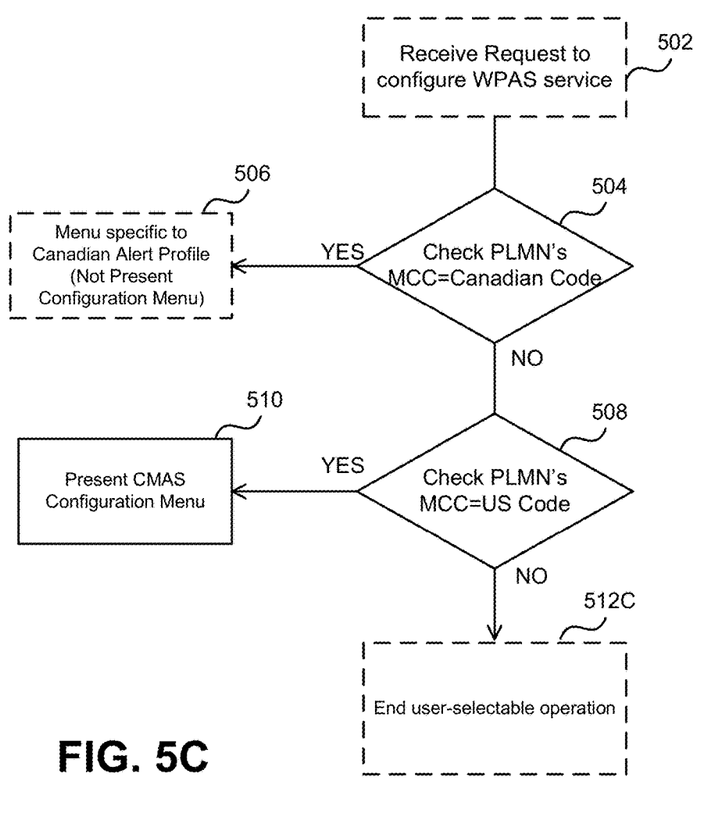
FIG. 5C illustrates a further exemplary configuration process for use in a mobile device.

FIGS. 5A-5C illustrate exemplary configuration processes for use in a mobile device. The methods of FIGS. 5A-5C may be implemented in the mobile device 102 in FIG. 1 or 212 in FIG. 2 and may be configured to operate in a WPAS based system, such as the system 100 of FIG. 2. For example, upon receipt of a request from the user to configure a public alert service (e.g., WPAS service) (502), the PLMN's MCC is checked (504). If the PLMN's MCC=a Canadian Code (i.e., '302') (504), the mobile device is located in Canada. In this case, the mobile device may provide a Canadian specific menu (506), but does not present a configuration menu (506) (e.g., CMAS configuration menu) to opt out receiving WPAS alerts since receiving WPAS alerts are mandatory. At this step (506), if RMT or similar test and/or any other selectable options are available from the WPAS service and are supported by the mobile device, such options may be presented so that the user turns them on or off.

If the PLMN's MCC≠the Canadian Code, it is determined that the PLMN's MCC=a United States Code (e.g., '310', '311', '312') (508). If yes, the mobile device is in the United States. In this depicted example, the mobile device presents a CMAS specific configuration menu (510), which may allow the use to opt out receiving WEA messages for Imminent threats and AMBER classes alerts. The CMAS configuration menu may include Extreme Alerts ON/OFF; Sever Alerts ON/OFF; and/or Amber Alerts ON/OFF settings, those of which are not associated with Presidential Alerts in the context of the CMAS standard. Since Presidential Alerts are mandatory under the CMAS standard, Presidential Alerts ON/OFF setting is not eligible. At this step (510), if RMT or similar test and/or any other selectable options are available from the CMAS service and are supported by the mobile device, such options may be presented so that the user selectively turns them on or off If the PLMN's MCC≠Canadian Code and the United States Code, it is determined that the mobile device is not in Canada or the United States. If the PLMN's MCC≠Canadian Code and the United States Code, the mobile device may present a full CMAS configuration menu to opt out a public alert (512A) as shown in FIG. 5A. If the PLMN's MCC≠Canadian Code and the United States Code, the mobile device may provide some other menus or treatment (512B) as shown in FIG. 5B. If the PLMN's MCC≠Canadian Code and the United States Code, the mobile device may not provide any user selectable menus (512C) as shown in FIG. 5C. The actions 512A, 512B and 512C are provided by way of examples only. If the PLMN's MCC≠Canadian Code and the United States Code, the mobile device may operate in accordance with a local profile.

Mobile devices in accordance with the present disclosure are described in detail. In one exemplary embodiment, a client application may be loaded onto a mobile device in order to implement the foregoing embodiments.

Figure 6:
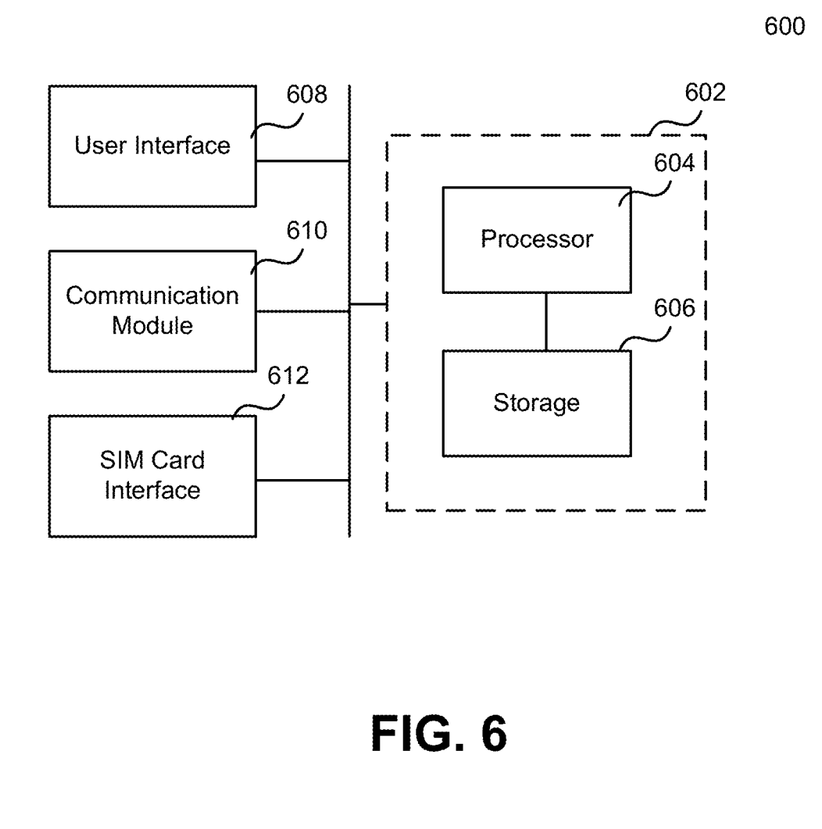
FIG. 6 illustrates an example of a mobile device that may be operable in the system of FIG. 1 or FIG. 2

FIG. 6 illustrates an example of a mobile device that may be operable in the system shown in FIG. 1 and FIG. 2. The mobile device 600 of FIG. 6 may correspond to the mobile device 102 in FIG. 1 or 212 shown in FIG. 2. The mobile device 600 of FIG. 6 includes circuitry 602 having one or more processors 604 and one or more computer readable storages 606 coupling to the one or more processors 604, one or more user interface modules 608, and one or more communications modules 610 for wireless communications. The communications modules 610 may include a receiver for receiving signals via wireless networks. The mobile device 600 may include a SIM card interface 612 for communications with a SIM card. MCC information may be extracted via the SIM card interface 612. The user interface modules 608 may include hardware modules (e.g., display, audio input/output module) and/or software module to interact with the circuitry. The processor 604 may execute software stored in the storage 606. The storage 606 may include functionalities for wireless communications and applications for wireless services. The client application for public alerts may be loaded onto the storage 606 in the circuitry 602 of the mobile device 600. The circuitry 602 may include a configuration manager for dynamically configure the mobile device's behavior associated with public alerts. For example, the client application associated loaded onto the mobile device may act as at least part of the configuration manager. The client application may be loaded onto the mobile device 600 by the mobile device manufacturer.

In one exemplary embodiment, the client application in the mobile device 600 is responsible for implementing the behavior/functionality associated with public alerts and/or extraction or detection of the geographical location information associated with the mobile device, according to the present description. In a further exemplary embodiment, the client application may implement other functionality as desired. Those skilled in the art will appreciate that the client application and method according to the present description effectively allows the mobile device 600 to take on different personalities or characteristics. In a further exemplary embodiment, the client application and method allows the mobile device 600 to take on a Canadian-specific personality for wireless emergency or public alerting applications.

In one exemplary embodiment, the client application on the mobile device 600 may retrieve the IMSI information (for determining the MCC) from the device's USIM through an operating system (OS) command. Upon determination of the MCC from the device's IMSI information, the client application causes the mobile device 600 to implement or activate the country-specific (e.g., Canada specific) profile or personality for the application/service at hand. For example, for wireless emergency alert applications/services such as the Canadian WPAS or the United States CMAS or WEA, upon consulting the IMSI information of the mobile device and determining the MCC and/or determining the MCC of the PLMN, the client application may cause activation of the Canadian-specific or US-specific audio alerting attention signal and alert vibration cadence as specified by the associated WPAS or CMAS/WEA requirements specification. For example, for Canada specifically, the mobile device 600 that is a WPAS capable mobile device loaded with the client application according to the present description will use an audio attention signal setting that meets the requirements defined in the National Public Alerting System Common Look and Feel Guidance 1.0 and a vibration cadence signal setting that meets the requirements defined in FPT REQUIREMENTS for Wireless Public Alerting Dissemination. Similar US-specific requirements for a common audio attention signal and common vibration cadence are defined in 47 CFR part 10. Further, the mobile device 600 that is a WPAS capable mobile device loaded with the client application according to the present description will use the Canadian alert banner (Message Header) setting that meets the requirements of National Public Alerting System Common Look and Feel Guidance as defined in SOREM Public Alerting Working Group, National Public Alerting System Common Look and Feel Guidance 1.0.

Figure 7:
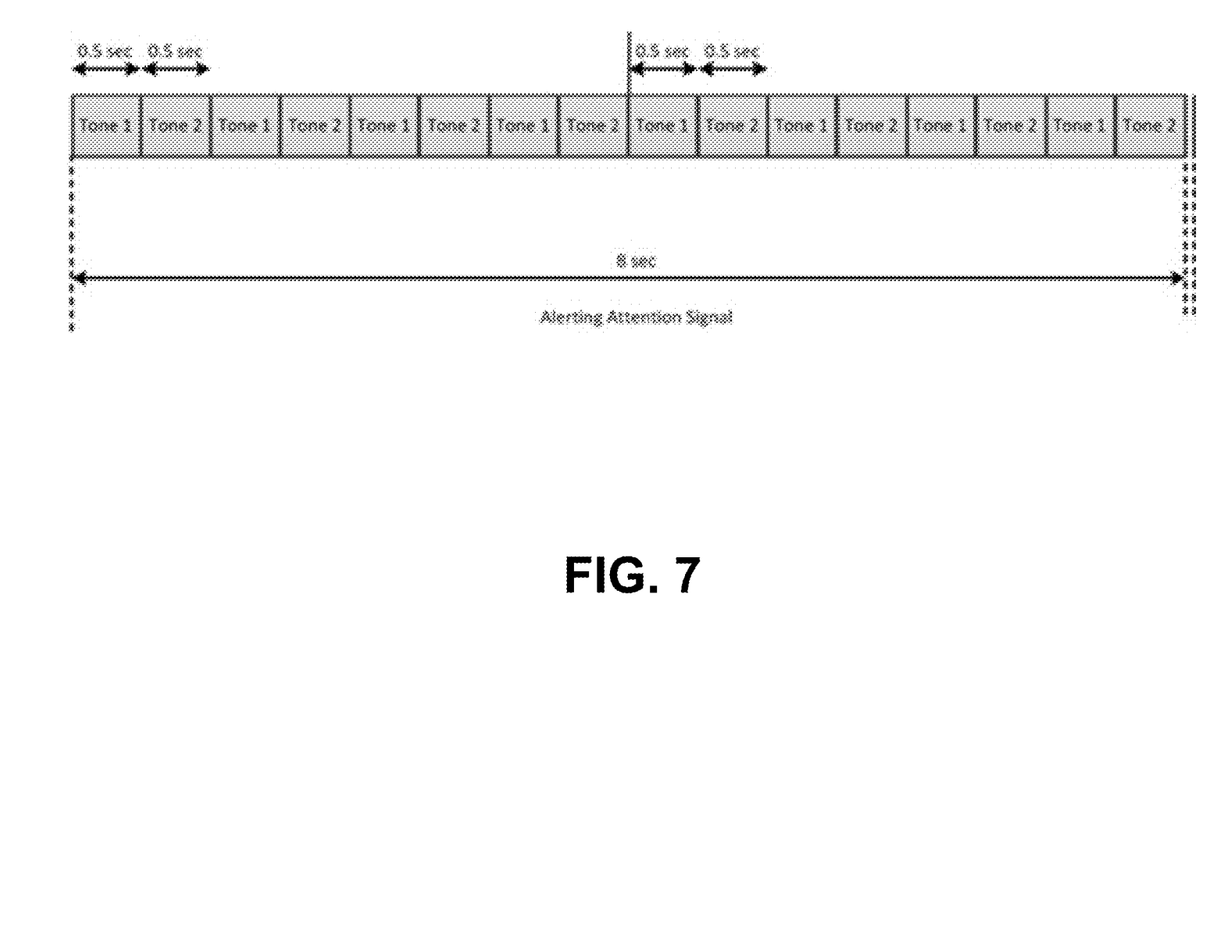
FIG. 7 illustrates an example of a temporal pattern of a Canadian WPAS alerting attention signal.

According to the current WPAS standard, the Canadian alert attention signal takes a form of the temporal pattern shown in FIG. 7. The Canadian audio attention signal is comprised of two alternating complex tones. Tone 1 is formed by the combination of three frequencies, 932.33 Hz, 1046.5 Hz and 3135.96 Hz, modulated at 7271.96 Hz. Tone 2 is formed by the combination of the three frequencies 440 Hz, 659.26 Hz and 3135.96 Hz, modulated at 1099.26 Hz. The duration of the audio attention signal is 8 seconds and alternates between Tone 1 and Tone 2 every 0.5 second.

According to the current WPAS standard, the Canadian alert vibration cadence employs a temporal pattern that matches Canadian audio attention signal. This is a "fast" 0.5 second vibration during Tone 1 and a 0.5 second "slow" vibration during Tone 2 for the entire duration of the Canadian audio attention signal. If not possible on certain mobile devices, a vibration cadence of 0.5 second ON and 0.5 second OFF applies. The duration of the Canadian alert vibration cadence is 8 seconds.

According to the current WPAS standard, the Canadian alert banner is a bilingual (English and French) title bar that is generated within the mobile device and reads as follows: Emergency Alert/Message D'Alerte. The Canadian alert banner remains concurrently on the screen with the Alert Message until the user closes or deletes the Alert Message.

In the event that the audience alert message is updated, the Canadian alert banner may also be displayed with the updated audience alert message, the Canadian Alert Vibration Cadence may be used to introduce the updated audience alert message; and/or the Canadian audio attention signal may be used to introduce the updated audience alert message.

Figure 8:
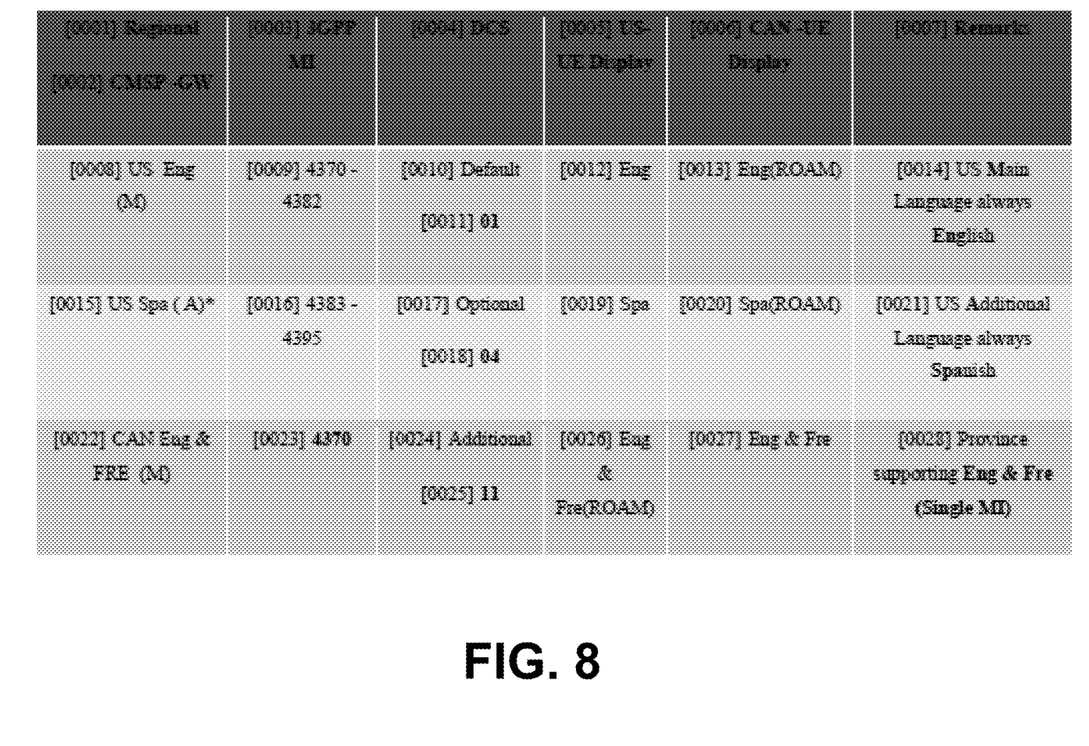
FIG. 8 illustrates an example of a roaming specification chart that may be applied to the system of FIG. 1 or 2.

It will be appreciated that the client application referred to above may further be configured to receive authorized emergency or public alerts via Cell Broadcast (SMS-CB) technology, in one example, and to visually present said emergency or public alerts on a subscriber's mobile device. In the SMS-CB, there may be two blocks for each message and contain text in English and French, in regional specific order of priority. The Data Coding Scheme (DSC) for the language may be 11 (UCS –2) currently being evaluated for global use. There may be various ways implementing the function of formatting, and normalizing for language character abnormalities etc. FIG. 8 illustrates an example of a roaming specification chart illustrating the differences between U.S. and Canada. In the Canadian option, addition of DCS 11 [H] equals UCS –2, to default GSM-7.

In one exemplary embodiment, the client application on the mobile device 600 may use any other information contained in the device USIM's IMSI, for example the mobile network code (MNC), in order to change the personality or characteristics of a given service or application. For example, in the case of emergency or public alerts, the client application may determine that the alert banner or background colour of the visually presented emergency or public alert message should appear in the specific branded colour of the mobile network operator corresponding to the MNC in the IMSI if allowed by the Public Safety Authorities. The client application may keep the entire alerts to be presented within one screen.

In one exemplary embodiment, the WPAS capable mobile device described herewith may include other functions. For example, the use of Uniform Resource Locator (URL), which is a reference (an address) to a resource on the internet, or an embedded telephone number, may be included at the discretion of the Alerting Authority in WPAS Alert Messages. WPAS alerts do not support hyperlink. This reduces network congestion during Emergencies.

Any processing of the disclosure may be implemented by causing a processor, digital signal processors (DSP), application-specific integrated circuit (ASIC), or components of a processor in a system (e.g., 102 of FIG. 1, 212 of FIG. 2, 600 of FIG. 6) to execute a computer program or provide functions. In this case, a computer program product can be provided to a computer or a mobile device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as magnetic tapes, hard disk drives, flash memory, etc.), optical magnetic storage media (e.g. magneto-optical disks), compact disc read only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. The term "configured to (perform a task)" as used herein includes being programmable, programmed, connectable, wired or otherwise constructed to have the ability to perform the task when arranged or installed as described herein.

While the description is provided with references to the Canadian WPAS specification, it will be appreciated that various other handlings may be employed to change the personality or characteristics of a given service or application, depending on the detected country information or other information contained in the IMSI/PLMN. As well, it will be apparent to a person skilled in the art that other implementations of the systems are possible, for example, depending on the desired or customized personality or characteristics of a given service or application in various countries.

While one or more embodiments have been provided in the present disclosure, it may be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented. A number of variations and modifications can be made without departing from the scope of the invention as defined in the claims.

All citations are hereby incorporated by reference.

What is claimed is:

1. A method for wireless public alerts, comprising:
   extracting geographical location information associated with a mobile device and/or a subscriber of the mobile device, the mobile device being configured to receive public alert services over a home network and a roaming network;
   based on the geographical location information, configuring the mobile device's behavior associated with the public alert services, comprising:
      responsive to determining that the mobile device is connected to the roaming network, determining whether a device setting option different from the home setting for the home network is selectable;
      responsive to determining that the device setting option is selectable for the mobile device connected to the roaming network, changing a user interactive menu displayed on the mobile device to provide the device setting option; and
      responsive to determining that the device setting option is not selectable for the mobile device connected to the roaming network, activating the home setting configured for the home network.

2. A method according to claim 1, wherein extracting geographical location information comprises:
   obtaining a Mobile Country Code (MCC) associated with the mobile device.

3. A method according to claim 2, wherein configuring the mobile device's behavior associated with the public alert services, comprises:
   based on the MCC, triggering one of available mobile device's behaviors.

4. A method according to claim 2, wherein obtaining a MCC comprises:
   obtaining a MCC of International Mobile Subscriber Identity (IMSI) and/or a MCC of Public Land Mobile Network (PLMN) associated with the mobile device.

5. A method according to claim 4, comprising at least one of:
   based on the IMSI's MCC, determining the subscriber's identity;

based on the PLMN's MCC, determining a current location of the mobile device; and
determining that the mobile device is roaming.

6. A method according to claim 4, comprising:
comparing the IMSI's MCC and the PLMN's MCC.

7. A method according to claim 6, wherein configuring the mobile device's behavior associated with the public alert services, comprises:
based on the comparison, activating an alert attention signal setting, a vibration cadence setting, and/or an alert banner setting from one or more available settings.

8. A method according to claim 6, wherein configuring the mobile device's behavior associated with the public alert services, comprises:
based on the comparison, selecting a default setting or a local setting specific to the roaming network to configure the mobile device's behavior.

9. A method according to claim 8, wherein the default setting and the local setting include a setting specific to Wireless Public Alerting Service (WPAS), a setting specific to a Commercial Mobile Alert System (CMAS), and/or a different setting specific to a 3rd Generation Partnership Project (3GPP) public alert service system.

10. A method according to claim 1, wherein configuring the mobile device's behavior associated with the public alert services, comprises:
in response to determination that the mobile device is roaming, selectively configuring the mobile device's behavior based on a local setting specific to the roaming network and associated with a local public alert service or a default setting.

11. A method according to claim 4, wherein configuring the mobile device's behavior associated with the public alert services, comprises:
based on the IMSI's MCC, the PLMN's MCC and/or a combination thereof, selectively present a user interactive menu to enable the user to opt out a receipt of a public alert.

12. A method according to claim 1, wherein the mobile device is a WPAS compatible device and wherein:
based on the geographical location information, activating a WPAS bilingual alert banner in receipt of a public alert from a public alert service other than the WPAS.

13. A mobile device comprises:
a module for receiving wireless signals including alert messages from public alert services over a home network and a roaming network; and
a configuration manager configured to
extract geographical location information associated with the mobile device and/or a subscriber of the mobile device; and
based on the geographical location information, configure the mobile device's behavior associated with the public alert services, the configuration comprising;
responsive to determining that the mobile device is connected to the roaming network, determining whether a device setting option different from the home setting for the home network is selectable;
responsive to determining that the device setting option is selectable for the mobile device connected to the roaming network, changing a user interactive menu displayed on the mobile device to provide the device setting option, and
responsive to determining that the device setting option is not selectable for the mobile device connected to the roaming network, activating the home setting configured for the home network.

14. A mobile device according to claim 13, wherein the configuration manager is configured to:
identify CBS messages with a Message Identifier (MI) in the range of 4352-6399.

15. A mobile device according to claim 13, wherein the configuration manager is configured to:
based on a Mobile Country Code (MCC) associated with the mobile device, determine the geographical location information.

16. A mobile device according to claim 13, wherein the configuration manager is configured to:
based on a Mobile Country Code (MCC) associated with the mobile device, trigger one of available mobile device's behaviors.

17. A mobile device according to claim 13, wherein the configuration manager is configured to:
obtain a MCC of International Mobile Subscriber Identity (IMSI) and a MCC of Public Land Mobile Network (PLMN) associated with the mobile device to determine the geographical location information.

18. A mobile device according to claim 13, wherein the configuration manager is configured to:
based on a IMSI's MCC, a PLMN's MCC and/or a combination thereof, selectively configure the mobile device's behavior based on a local setting specific to the roaming network and associated with a local public alert service or a default setting.

19. A mobile device according to claim 13, wherein the configuration manager is configured to:
based on a IMSI's MCC, a PLMN's MCC and/or a combination thereof, selectively present a user interactive menu to configure the mobile device's behavior associated with a public alert.

20. A non-transitory computer readable storage medium storing instructions, which when executed by a mobile device, cause the mobile device to perform a method comprising:
extracting geographical location information associated with a mobile device and/or a subscriber of the mobile device, the mobile device being configured to receive public alert services over a home network and a roaming network;
based on the geographical location information, configuring the mobile device's behavior associated with the public alert services, comprising:
responsive to determining that the mobile device is connected to the roaming network, determining whether a device setting option different from the home setting for the home network is selectable;
responsive to determining that the device setting option is selectable for the mobile device connected to the roaming network, changing a user interactive menu displayed on the mobile device to provide the device setting option; and
responsive to determining that the device setting option is not selectable for the mobile device connected to the roaming network, activating the home setting configured for the home network.

\* \* \* \* \*